Nov. 6, 1928.
M. F. CARR
1,690,400
LUBRICATING APPARATUS
Filed March 14, 1922
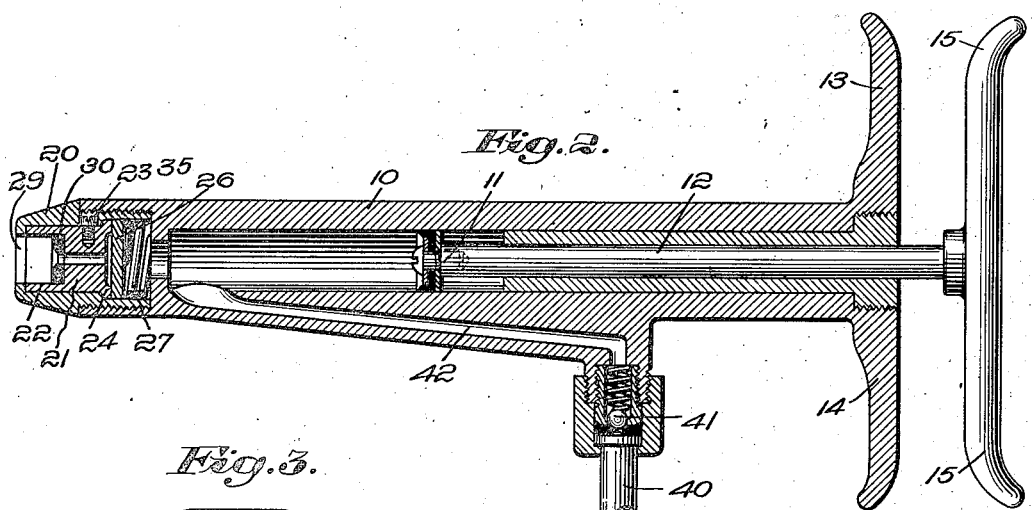
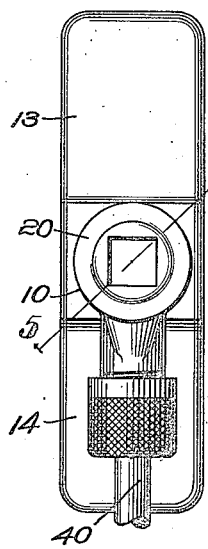
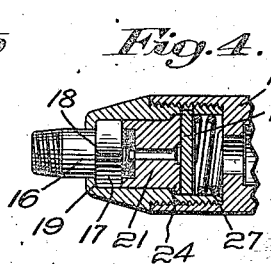
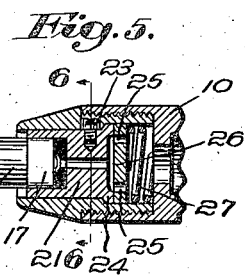
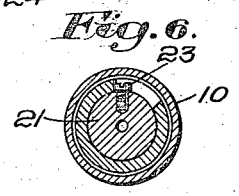
Inventor:
Moses F. Carr,
by Emery Booth Janney Varney
Attys.

Patented Nov. 6, 1928.

1,690,400

UNITED STATES PATENT OFFICE.

MOSES F. CARR, OF BROOKLINE, MASSACHUSETTS, ASSIGNOR, BY MESNE ASSIGNMENTS, TO THE BASSICK MANUFACTURING COMPANY, OF CHICAGO, ILLINOIS, A CORPORATION OF DELAWARE.

LUBRICATING APPARATUS.

Application filed March 14, 1922. Serial No 543,644.

This invention pertains to improvements in lubricating apparatus. It is among the objects of the invention to provide lubricating apparatus adapted quickly to be connected and disconnected to lubricant-receiving nipples on the parts to be lubricated, and which is very readily manipulated not only for coupling and uncoupling but in so far as the supply of lubricant thereto is concerned.

In the drawings, which show a preferred embodiment of one form of my invention:—

Figure 1 is a plan of a preferred form of lubricant gun;

Fig. 2 is a section on the line 2—2 of Fig. 1, being partly in elevation;

Fig. 3 is an end elevation taken from the left of Figs. 1 and 2;

Fig. 4 is a section through the nozzle of the apparatus on the same line as Fig. 2, showing the nozzle connected to a lubricant-receiving nipple;

Fig. 5 is a section through the nozzle after coupling and valve opening operation, being taken on the line 5—5 of Fig. 3 and being partly in elevation; and Fig. 6 is a section on the line 6—6 of Fig. 5.

Referring to the drawings and to the preferred form of my invention selected for illustrative purposes, I have shown lubricant-delivering apparatus presenting a cylinder 10 having a reciprocable piston 11 therein carried by a piston rod 12 projecting through the rear end of the cylinder and adapted to be operated by squeezing pressure of a hand between the handle 13, 14 on the cylinder and the handle 15, 15 on the rear of the piston rod. The discharge end of the cylinder 10 is provided with a coupling presenting an axial opening 29 for entrance of a lubricant-receiving nipple. The lubricant-receiving nipple 16, as shown in Figs. 4 and 5, is provided with a square head 17 presenting underlying shoulders 18 adapted to be engaged by shoulders 19 on the nozzle 20 when the nozzle is turned relative to the nipple. Within the nozzle 20, I have provided a rotatable sealing part 21 having forwardly extending projections 22 laterally to engage the sides of the head of the nipple 16 when entered therein. Turning movement of the sealing part 21 relative to the nozzle 20 is limited by a screw 23 entering a slot 24 in the nozzle. The sealing part 21 is perforate to permit passage of lubricant therethrough and at its inner or rearward end presents a slot 24 cooperating with ports 25 in a valve part 26 to provide for opening and closing of the valve as coupling and uncoupling are effected.

A sealing washer 30 may be carried by the sealing part 21 to insure a tight seal against the head of the lubricant-receiving nipple. The valve 26, herein shown as of the rotary type, may be pressed toward its seat by the spring 27 which, together with the pressure of the lubricant, not only presses the valve tightly against its seat on the rear of the sealing part 21, but also presses the sealing part 21 tightly against the inclined seat 35 on the nozzle 20.

Lubricant may be supplied to the barrel from a source of lubricant under relatively low pressure through a flexible connection 40, check valve 41 and passage 42. The source of lubricant under relatively low pressure may include a cylinder having a piston slidable therein, on one side of which is the lubricant and on the other side of which the pressure is applied to the lubricant. This pressure may be applied by a spring contained in the cylinder or otherwise acting on the piston or, if desired, by the admission of air to that end of the cylinder opposite the lubricant containing end thereof.

Assuming the cylinder to be disconnected from the lubricant-receiving nipple, the parts will lie in the relative position shown in Fig. 2. If the nozzle be now slipped over the head of the nipple and the gun turned a few degrees until the screw 23 reaches the end of its slot in the nozzle 20, the lower faces of the square head of the nipple 16 will overlie the shoulders 19 on the nozzle, thus effecting coupling; and the valve disc 26 will have turned with the cylinder 10 until the por' are in register as shown in Fig. 5, thus opening the valve. If now pressure be exerted between the handle 13, 14 on the cylinder and the handle 15, 15 connected to the piston rod, great pressure will be exerted in the cylinder 10 by reason of the small area of the piston 11. The check valve 41 will be forced against its seat and lubricant will be expelled through the valve and coupling into the lubricant-receiving nipple 16 and, after passing therethrough, to the part to be lubricated. If now the handles are released, the pressure in the pipe 40 from the lubricant under relatively low pressure will open the check valve 41 and press back the piston 11, thus re-charging the device for lubricating the next or succeeding nipple. If desired, repeated charges may of course be forced through the same nipple.

While I have shown and described a preferred form of my invention, it will be understood that major changes involving omission, substitution, alteration and reversal of parts, and even changes in the mode of operation, may be made without departing from the scope of my invention, which is best defined in the following claim.

I claim:

A lubricating device comprising a body having a longitudinal bore, a transverse handle integral with and at one end of said body, a quick detachable coupling device secured at the other end of said body, said device being adapted to be coupled with a lubricant receiving fitting by rotation relative thereto, a high pressure plunger in the bore of said body, a second handle adjacent the handle on said body and operatively connected to said plunger, and a low pressure lubricant supply connection secured to said body intermediate said handles and said coupling, said connection being in communication with the bore in said body at a point adjacent said coupling device.

In testimony whereof, I have signed my name to this specification.

MOSES F. CARR.